United States Patent
Bostian et al.

(10) Patent No.: US 9,165,057 B1
(45) Date of Patent: Oct. 20, 2015

(54) METHOD AND APPARATUS FOR EXTRACTING QUERIES FROM WEBPAGES

(71) Applicant: Bank of America Corporation, Charlotte, NC (US)

(72) Inventors: Michael Bostian, Cary, NC (US); Stephen L. Yeager, Seattle, WA (US); Ramakrishna R. Yannam, Seattle, WA (US); Viju Kothuvatiparambil, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/642,998

(22) Filed: Mar. 10, 2015

(51) Int. Cl.
   *G06F 17/30* (2006.01)
   *G06F 7/00* (2006.01)

(52) U.S. Cl.
   CPC ...... *G06F 17/30637* (2013.01); *G06F 17/3053* (2013.01); *G06F 17/3097* (2013.01); *G06F 17/30401* (2013.01); *G06F 17/30867* (2013.01)

(58) Field of Classification Search
   CPC .......... G06F 17/30637; G06F 17/3097; G06F 9/44446
   See application file for complete search history.

(56) References Cited

U.S. PATENT DOCUMENTS

| | | |
|---|---|---|
| 6,766,320 B1 | 7/2004 | Wang et al. |
| 6,938,000 B2 | 8/2005 | Joseph et al. |
| 7,349,899 B2 | 3/2008 | Namba |
| 2005/0187919 A1 | 8/2005 | Takahashi et al. |
| 2007/0033532 A1 | 2/2007 | Lemelson |
| 2007/0073651 A1 | 3/2007 | Imielinski |
| 2008/0104065 A1* | 5/2008 | Agarwal et al. ............ 707/6 |
| 2010/0228711 A1 | 9/2010 | Li et al. |
| 2014/0006012 A1 | 1/2014 | Zhou et al. |

FOREIGN PATENT DOCUMENTS

| | | |
|---|---|---|
| CN | 104050256 | 9/2014 |
| JP | 4124142 | 7/2008 |

\* cited by examiner

*Primary Examiner* — Jeffrey A Burke
(74) *Attorney, Agent, or Firm* — Weiss & Arons LLP; Michael A. Springs, Esq.

(57) ABSTRACT

Methods for extracting queries from webpages is provided. Methods may include receiving a plurality of queries. Each query in the plurality may be input into a search box located on a public-facing webpage. Methods may include receiving content associated with each of the public-facing webpages. Methods may include receiving identifying information associated with an inputter of each query. Methods may include selecting at least one query from the plurality of queries based at least in part on factors. The factors may include query length. The factors may include query rank. The query rank may be based in part on the magnitude of predetermined terminology included in the at least one query. The predetermined terminology may be stored on a computer-readable memory. The factors may include the grammatical relationship between query terms. The factors may include the identifying information about the inputter associated with the at least one query.

5 Claims, 11 Drawing Sheets

Un-analyzed Query List

| QUERY NUMBER | QUERY TEXT | QUERY WEBPAGE | QUERY IP ADDRESS |
|---|---|---|---|
| 1 | What are the rates for home equity loans? | www.abcde.com/home/loans | xxx.xxx.xxx.xxx |
| 2 | How can I set up direct deposit to mine account? | www.abc.com/home/checks | xxx.xxx.xxx.xxx |
| 3 | How can I get a status update on a dispute previously submitted? | www.def.com/johndoe/account | xxx.xxx.xxx.xxx |
| 4 | Who should I call if I believe my account has been compromised? | www.hij.com/jacobdoe/cards | xxx.xxx.xxx.xxx |
| 5 | I forgot my username, what do I do? | www.vwx.com/home | xxx.xxx.xxx.xxx |
| 6 | What if I find errors or incomplete information in credit reports? | www.mno.com/home/creditreporting | xxx.xxx.xxx.xxx |
| 7 | What factors can affect my credit score and how are they reported? | www.pqr.com/home | xxx.xxx.xxx.xxx |
| 8 | What is my password? | www.stu.com | xxx.xxx.xxx.xxx |
| 9 | How can I send or receive a wire transfer? | www.jkl.com/home/transfers | xxx.xxx.xxx.xxx |

| Analyzed Query List on Second Parameter (Predetermined Language) | | | | | | |
|---|---|---|---|---|---|---|
| QUERY NUMBER | QUERY TEXT | QUERY WEBPAGE | QUERY IP ADDRESS | SCORE BASED ON FIRST PARAMETER | SCORE BASED ON SECOND PARAMETER | COMBINED SCORE |
| 1 | What are the rates for home equity loans? | www.abcde.com/home/loans | xxx.xxx.xxx.xxx | 6 | 8 | 7 |
| 2 | How can I set up direct deposit to my account? | www.abc.com/home/checks | xxx.xxx.xxx.xxx | 8 | 6 | 7 |
| 3 | How can I get a status update on a dispute previously submitted? | www.def.com/johndoe/account | xxx.xxx.xxx.xxx | 9 | 6 | 8 |
| 4 | Who should I call if I believe my account has been compromised? | www.hij.com/jacobcoe/cards | xxx.xxx.xxx.xxx | 9 | 4 | 6 |
| 5 | I forgot my username, what do I do? | www.vwx.com/home | xxx.xxx.xxx.xxx | 6 | 0 | 3 |
| 6 | What if I find errors or incomplete information in credit reports? | www.mno.com/home/creditreporting | xxx.xxx.xxx.xxx | 8 | 10 | 9 |
| 7 | What factors can affect my credit score and how are they reported? | www.pqr.com/home | xxx.xxx.xxx.xxx | 10 | 8 | 9 |
| 9 | How can I send or receive a wire transfer? | www.jkl.com/home/transfers | xxx.xxx.xxx.xxx | 7 | 8 | 8 |

Process for analyzing based on second parameter

- The query with the most words included in the predetermined language has five words included in the predetermined language
- 5 in the amount of predetermined language = 10/10 scoring
- Analyze all queries based on a formula, utilizing the highest score of five predetermined language words
- Calculate combined score for each query based on the first parameter and the second parameter
- Query 5 falls below a predetermined threshold value of 5 for the combined score
- Discard Query 5

FIG. 6

Analyzed Query List on Third Parameter (Grammatical Relationship) — 702

| QUERY NUMBER | QUERY TEXT | QUERY WEBPAGE | QUERY IP ADDRESS | SCORE BASED ON 1ST & 2ND PARAMETER | SCORE BASED ON THIRD PARAMETER | COMBINED SCORE |
|---|---|---|---|---|---|---|
| 1 | What are the rates for home equity loans? | www.abcde.com/home/loans | xxx.xxx.xxx.xxx | 7 | 10 | 9 |
| 2 | ~~How can I set up direct deposit to my account?~~ | ~~www.abc.com/home/checks~~ | ~~xxx.xxx.xxx.xxx~~ | ~~7~~ | ~~1~~ | ~~4~~ |
| 3 | How can I get a status update on a dispute previously submitted? | www.cef.com/johncoe/account | xxx.xxx.xxx.xxx | 8 | 8 | 8 |
| 4 | Who should I call if I believe my account has been compromised? | www.hij.com/jacobdoe/cards | xxx.xxx.xxx.xxx | 6 | 9 | 8 |
| 6 | What if I find errors or incomplete information in credit reports? | www.mno.com/home/creditreporting | xxx.xxx.xxx.xxx | 9 | 10 | 10 |
| 7 | What factors can affect my credit score and how are they reported? | www.pqr.com/home | xxx.xxx.xxx.xxx | 9 | 7 | 8 |
| 9 | How can I send or receive a wire transfer? | www.jkl.com/home/transfers | xxx.xxx.xxx.xxx | 8 | 10 | 9 |

732 — Process for analyzing based on third parameter

734 —
- Highest metric for scoring in grammatical relationship is 10
- 10 in grammatical relationship = 10/10 scoring
- Calculate a score for each query based on highest score (10)
- Calculate an average score based on combined score and the score based on third parameter to equal new combined score
- Query 2 falls below predetermined threshold value of 5 for the new combined score
- Discard Query 2

Analyzed Query List 1002

| QUERY NUMBER | QUERY TEXT | QUERY WEBPAGE | QUERY IP ADDRESS | COMBINED SCORE |
|---|---|---|---|---|
| 1 | What are the rates for home equity loans? | www.abcde.com/home/loans | xxx.xxx.xxx.xxx | 10 |
| 3 | How can I get a status update on a dispute previously submitted? | www.def.com/johndoe/account | xxx.xxx.xxx.xxx | 7 |
| 6 | What if I find errors or incomplete information in credit reports? | www.mno.com/home/creditreporting | xxx.xxx.xxx.xxx | 10 |
| 9 | How can I send or receive a wire transfer? | www.jkl.com/home/transfers | xxx.xxx.xxx.xxx | 7 |

FIG. 10

METHOD AND APPARATUS FOR EXTRACTING QUERIES FROM WEBPAGES

FIELD OF TECHNOLOGY

This invention relates to deriving information from webpages. More specifically, this invention relates to extracting queries from webpages.

BACKGROUND OF THE DISCLOSURE

Many websites present a list of questions and answers, which are frequently asked by users or customers. This list of questions has conventionally been known as frequently asked questions, or FAQs.

From an entity perspective, it is crucial that the FAQ list incorporates informative, noteworthy, and significant questions. A user who is encountering a problem or question should be able to access the FAQ list and find a solution to his or her problem, or answer to his or her question. This list should provide answers to a majority of website user's questions, and consequently, lessen the frustration of website users who encounter a problem.

FAQ lists may also increase efficiency by limiting the amount of human intervention required to manage a website. A user or customer, encountering a problem or question, may refer to a FAQ list to find a solution of answer prior to contacting a human operator. Without a FAQ list, an online user encountering a problem or question, may be required to communicate the question or problem with website personnel. The user may communicate the question utilizing live chat applications, text messaging, email messages, telephone communication or any other suitable form of communications.

In order to determine which questions, or queries, should be included in the FAQ list, website administrators typically employ personnel to review a sampling of inputted questions. The process of selecting beneficial and useful queries from a plurality of queries may be time consuming and generate uneven results.

Therefore, it is beneficial to create a system which can identify beneficial queries from a plurality of queries in a standardized and efficient manner.

SUMMARY OF THE INVENTION

An apparatus for extracting queries from webpages is provided. The apparatus may include a receiver. The receiver may be configured to receive a plurality of queries. Each query in the plurality of queries may be input into a search box. The search box may be located on a public-facing webpage. The receiver may also be configured to receive content of the public-facing webpage. The receiver may also be configured to receive identifying information. The identifying information may be associated with an inputter of each query.

The apparatus may also include a processor. The processor may be configured to extract at least one query from the plurality of queries. The extracting may be based in part on a variety of factors. The factors may include the length of the query. The factors may also include the rank of the query. The rank may be based on the magnitude of predetermined terminology included in the query. The predetermined terminology may be stored in a computer-readable memory. Predetermined terminology may refer to a collection of terms which a business or institution defines. The collection of terms is generally related to the type of the particular business or institution.

The factors may also include a grammatical relationship between query terms to one another. The grammatical relationship may be a company-defined linguistic relationship, a language-defined linguistic relationship, or any other suitable linguistic relationship.

The factors may also include identifying information about an inputter associated with the query. The identifying information may include the name, telephone number, company address, home address, IP address, company name, type of employment, time the query was asked, type of device from which the query was transmitted or any other suitable information pertaining to the inputter.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 6 shows an illustrative diagram according to certain embodiments;

GLOSSARY

Public-facing webpage—A "public-facing webpage" refers to a webpage which is available and viewable by the general public via the World Wide Web, the Internet, or an intranet. A "public-facing webpage" may be viewed in an authenticated space. A "public-facing webpage" may be viewed in a non-authenticated space.

Inputter—An "inputter" refers to a user who inputs data, through the use of a human data-input device, such as a keyboard, mouse, stylus, touch screen, or speech recognition software, into a webpage.

Query—A "query" refers to a question or request for information posed by a user of a webpage.

Predetermined terminology—"Predetermined terminology" refers to a collection of terms which a business or institution defines. The collection of terms is generally related to the type of the particular business or institution.

Grammatical relationship—"Grammatical relationship" refers to the functional relationship between elements in a clause or sentence. The term refers to the role of a phrase or clause that determines syntactic behaviors of a sentence or other linguistic unit. The identification, analysis, and description of the structure of a given language's linguistic units combined with the given language's syntax determines the grammatical relationship.

Cyberspace location—A "cyberspace location" refers to a website or webpage in the theoretical environment in which communication over computer networks occurs.

Search box—A "search box" is a graphical control element used in computer programs. A search box usually has an input text box with the dedicated function of accepting user input to be searched for in a database.

Query rank—A "query rank" is the grade or status in which a query fulfills a specific set of requirements with respect to other queries.

DETAILED DESCRIPTION OF THE DISCLOSURE

Apparatus and methods for extracting queries from webpages is provided. The apparatus may include, or be included within, a PC, dedicated mainframe, specialized supercomputer or other suitable computing machine.

In some embodiments, a dedicated web-crawling computing machine may extract queries from webpages. This embodiment may be desirable because evaluation of the candidates for FAQs requires highly intensive analysis of dynamic data.

The apparatus may run substantially 24 hours a day, every day of the year. The constant operation of the apparatus may ensure accuracy of the results. The apparatus may be created to produce product for mass consumption.

The apparatus may also include a dedicated printer or other suitable transmitter. The printer or transmitter may transmit results. The results may include information, queries, statistics pertaining to queries, or any other suitable information.

The apparatus may include a receiver. The receiver may be configured to receive a plurality of queries. Each query in the plurality of queries may be input into a search box. Each search box may be a distinct search box. Some queries may be submitted from a single search box, while other queries may be submitted from one or more other search boxes.

Each search box may be located on a distinct public-facing webpage. A "public-facing webpage" may refer to a webpage which is available and viewable by the general public via the World Wide Web, the Internet, or an intranet. A public-facing webpage may be public with respect to an internal system in an intranet environment—e.g. diverse teams in a corporation may present queries on activities, information or projects which were executed by another team.

Some search boxes may be located on a single public-facing webpage, while other search boxes may be located on one or more public-facing webpages.

The receiver may also receive content associated with one or more of the public-facing webpages. The content may include information or data from the webpage. The content may also include the URP of the webpage. The content may also include a category associated with the webpage.

The receiver may also receive identifying information associated with an inputter of a query. The receiver may also receive identifying information associated with many inputters of many queries.

The identifying information may include the name, address, company name, phone number, cellular phone number, company address, age or any other pertinent information.

The identifying information may also include information pertaining to the device from which the user asked the query, the time of day the user asked the query, the geographical location from which the user asked the query or any other suitable information.

The apparatus may also include a processor. The processor may be configured to analyze a query in the plurality of queries. The analyzing may be based on a number of parameters. Because some parameters may be relatively more important and more determining than other parameters, the important parameters may be assigned a larger mathematical weight than other, less-important, parameters. The apparatus may also be configured to include machine-learning algorithms. The machine-learning algorithms may develop more updated parameters and more updated thresholds. The updated parameters and updated thresholds may assist in the processing and developing of information. The updated parameters and thresholds may become proprietary information to be used on future FAQs.

The parameters may include a first parameter. The first parameter may be query length. The processor may analyze each query in the plurality of queries based on the first parameter. The processor may analyze a query in the plurality of queries based on the first parameter.

Query length may be important and more determinative as to whether a query should be a FAQ at least because relatively shorter queries may be irrelevant and relatively longer queries may be inappropriate for mass consumption. Accordingly, queries that fall within a specified range of length may be desirable for identification as a FAQ.

The processor may also be configured to discard a query, from the plurality of queries, which falls below a predetermined threshold. The predetermined threshold may relate to fulfillment of the first parameter. The predetermined threshold may be dynamic with respect to the plurality of queries—e.g. if the top 5% of queries was requested based on query length, and 95% of the queries are less than 100 words, the determined threshold may be 100 words. This threshold may effectively return the top 5% of the plurality of queries.

The processor may also be configured to analyze a query from the plurality of queries based on a second parameter. The processor may also be configured to analyze each query from the plurality of queries based on the second parameter. The second parameter may be the magnitude of predetermined terminology included in the query's language. The predetermined terminology may be stored on a computer-readable memory.

The predetermined terminology may refer to a collection of terms which a business or institution defines. The collection of terms is generally related to the type of the particular business or institution.

The magnitude of predetermined terminology may be important and more determinative as to whether a query should be a FAQ at least because queries which relate to the type of business or institution may appear more professional and provide more directed answers. Accordingly, queries that contain a significant amount of words which are included in the predetermined language may be suitable for identification as a FAQ.

The processor may also be configured to discard a query, from the plurality of queries, which falls below a predetermined threshold. The predetermined threshold may relate to fulfillment of the second parameter.

The processor may also be configured to analyze a query, in the plurality of queries, based on a third parameter. The processor may also be configured to analyze each query, in the plurality of queries, based on the third parameter. The third parameter may be a grammatical relationship of query terms analyzed with respect to relationships to one another. The grammatical relationship may be predetermined by an entity.

The grammatical relationship of query terms to one another may be important and more determinative as to whether a query should be a FAQ at least because queries which contain a correct grammatical syntax may appear more authoritative and may be easier to comprehend. Accordingly, a query including a correct grammatical relationship between query terms may be suitable for identification as a FAQ.

The processor may also be configured to discard a query, from the plurality of queries, which falls below a predetermined threshold with respect to fulfillment of the third parameter.

The processor may also be configured to analyze a query in the plurality of queries based on a fourth parameter. The processor may also be configured to analyze each query in the plurality of queries based on the fourth parameter. The fourth parameter may be identifying information of an inputter of each query.

The inputter-identifying information may include a number of elements. Some elements may be deemed more important than other elements. Therefore, each elements may be assigned a mathematical weight. The more important elements may receive a higher weight. The less important elements may receive a lower weight. See Table A, below, which represents one illustrative, possible embodiment of how the elements of the identifying information may be weighted.

TABLE A

| Element of identifying information: | Determining factor | Weighted Percentage: |
| --- | --- | --- |
| Time the query was transmitted | Was the query transmitted between 9:00 AM - 6:00 PM? If not, how many minutes away is the time from 9:00 AM or 6:00 PM? | 35% |
| Type of Employment | Is the type of employment high ranking or low ranking? | 25% |
| Type of device from which the query was transmitted | Was the device a mobile device, or a desktop? | 20% |
| Home address | Was the home address in a higher ranking zip code or lower ranking zip code? | 20% |

Utilizing the weighed elements of identifying information, the processor may assign each query a score. The score may be assigned based on the fourth parameter, i.e., inputter-identifying information.

The inputter-identifying information may be important and more determinative as to whether a query should be a FAQ at least because queries which are transmitted from a proper setting may be carefully reasoned. A more senior inputter may invest more time into his or her query. Therefore, queries transmitted from a more senior inputter may be more logically sound. Accordingly, queries that are received from more formal settings and from more senior inputters may be optimal for identification as a FAQ.

The processor may also be configured to discard a query, from the plurality of queries, which falls below a predetermined threshold with respect to fulfillment of the fourth parameter.

The processor may also be configured to analyze a query, in the plurality of queries, based on a fifth parameter. The processor may also be configured to analyze each query, in the plurality of queries, based on the fifth parameter. The fifth parameter may be the content of the public-facing webpage associated with each query.

The content of the public-facing webpage may be important and more determinative as to whether a query should be a FAQ at least because queries which relate to the webpages from which they are asked may be more directed queries. Accordingly, queries that relate to the webpages from which they are asked may be optimal for identification as a FAQ.

The processor may also be configured to discard a query, from the plurality of queries, which falls below a predetermined threshold with respect to fulfillment of the fifth parameter.

The processor may also be configured to analyze a query, in the plurality of queries, based on a sixth parameter. The processor may also be configured to analyze each query, in the plurality of queries, based on the sixth parameter. The sixth parameter may be a geographical location of the inputter.

The sixth parameter may be a cyberspace location of the inputter. The sixth parameter may also be an IP address of the inputter.

The geographical location, cyberspace location or IP address of a query may be important and more determinative as to whether a query should be a FAQ at least because queries which are transmitted from certain locations may include queries pertaining to their location—e.g. a query transmitted from the United States may include a question pertaining to a 401(k) plan. This query would probably not be transmitted from a country which does not offer 401(k) plans. Accordingly, queries that relate to the location from which they are asked may be optimal for identification as a FAQ in the location from which they are asked. Therefore, FAQ lists may be location-specific, and a query may only appear on a FAQ list of a relevant location, such as a country, city, state or town.

The processor may also be configured to discard a query, from the plurality of queries, which falls below a predetermined threshold with respect to fulfillment of the sixth parameter.

While only six parameters have been outlined above, any suitable parameters are included within the scope of the invention. Also, the order of the parameters outlined above is merely for illustration purposes, and may be reconfigured by a user at any given time. A parameter may also be deleted at any time.

The apparatus may also be configured to store a query, or any other suitable information, including, but not limited to parameter information, query lists or reports, on the computer-readable memory.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Figure 1:
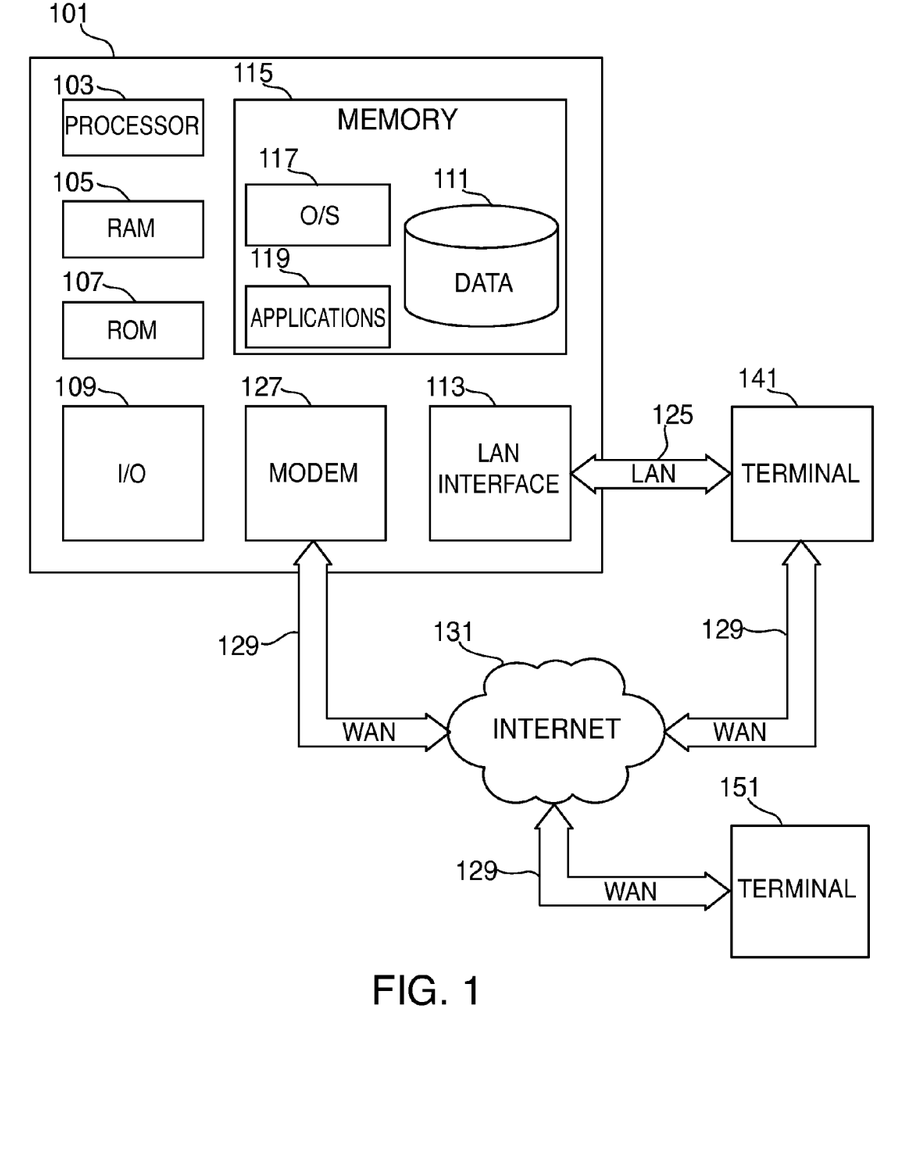
FIG. 1 shows an illustrative apparatus in accordance with principles of the invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer— e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, smartphone or any other suitable device for storing, transmitting and/or transporting relevant information. Terminals 151 and/or terminal 141 may be other devices. These devices may be identical to system 100 or different. The differences may be related to hardware components and/or software components.

Figure 2:
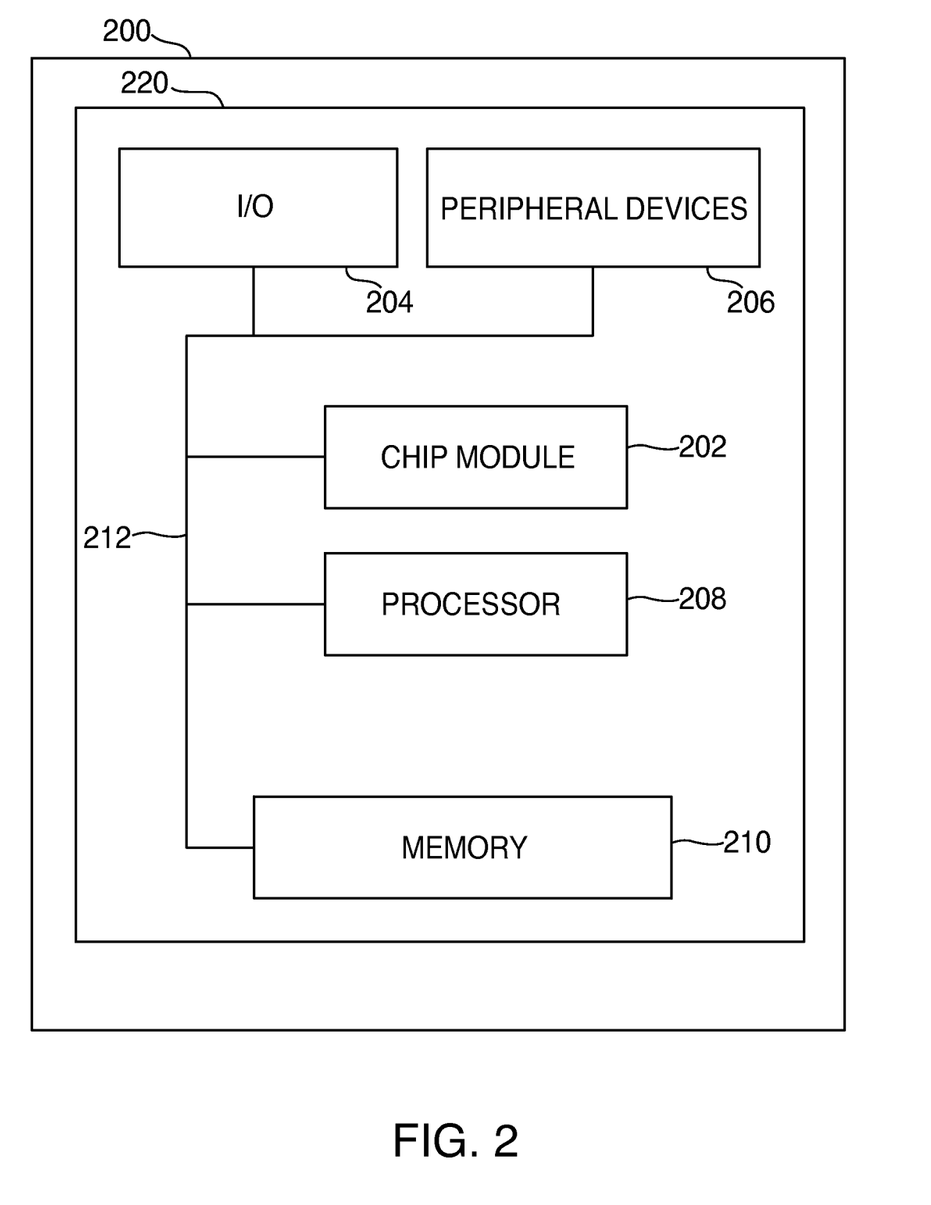
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, predict possible queries and machine-readable memory 210.

Machine-readable memory 210 may be configured to store in machine-readable data structures: information pertaining to a user, information pertaining to queries, the current time, information pertaining to query parameters, information pertaining to inputters of queries, information pertaining to query lists and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3A:
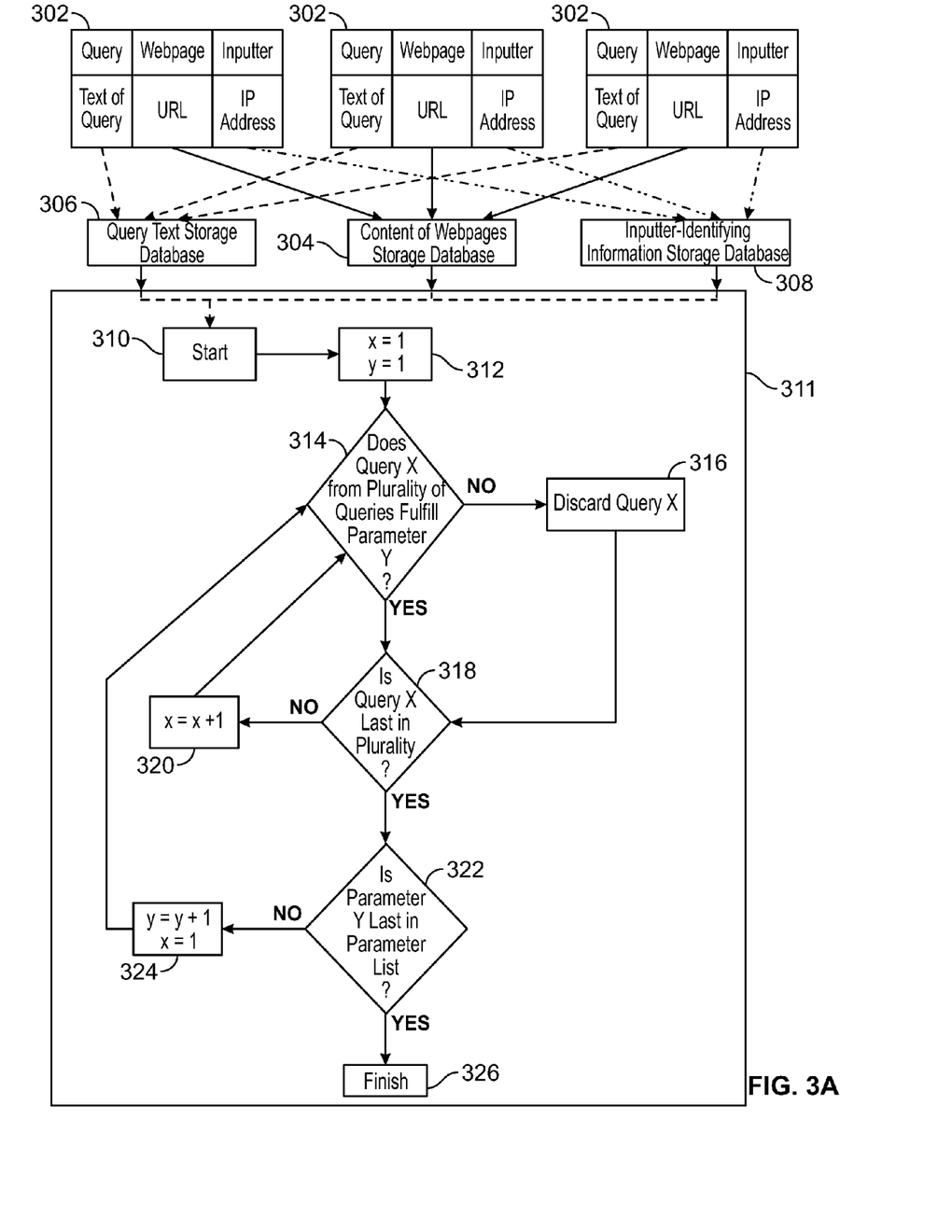
FIG. 3A shows an illustrative diagram according to certain embodiments.

FIG. 3A shows an illustrative diagram. Queries 302 may each include the text of the query, the URL of the webpage into which the query was entered and the IP address of the inputter. Queries 302 may include other information which is not shown. Queries 302 may not include all of the information shown.

Queries 302 may be transmitted to Query Text Storage Database 304. The URLs from queries 302 may be transmitted to Content of webpages storage database 306. The IP addresses from queries 302 may be transmitted into Inputter-identifying information storage database 308.

Information from plurality of queries 304, content of webpages 306 and identifying information about inputter 308 may be received at start box 310, in apparatus 311.

In apparatus 311 in step 312, variable x may be initialized to one and variable y may be initialized to one.

In step 314, a processor may determine if query x, which may be assigned the value of one, fulfills parameter y, which may be assigned the value of one (list of parameters not shown). If query x fulfills parameter y, the process may proceed to step 318. If query x does not fulfill parameter y, the process may proceed to step 316. In step 316, query x may be discarded, and the process may proceed to step 318.

In step 318, the processor may determine if query x is the last query in the plurality of queries. If query x is the last query in the plurality, the process may proceed to step 322. In step 322, the process may determine if parameter y is the last in the parameter list. If the parameter is the last in the parameter list, the process may proceed to step 326, and the process may be completed.

If the parameter is not the last in the parameter list, the process may proceed to step 324. In step 324, variable y may be set to y plus one, and variable x may be reset to one.

From step 324, the process may proceed back to step 314 using the updated variables.

If query x is determined not to be the last in the plurality of queries, the process may proceed to step 320. In step 320, variable x may be set to x plus one. The process may then proceed back to step 314 using the updated variable x.

After step 326, when the process may be completed, the updated plurality of queries may only includes queries which met a predetermined threshold for substantially all the parameters in the parameter list.

Figure 3B:
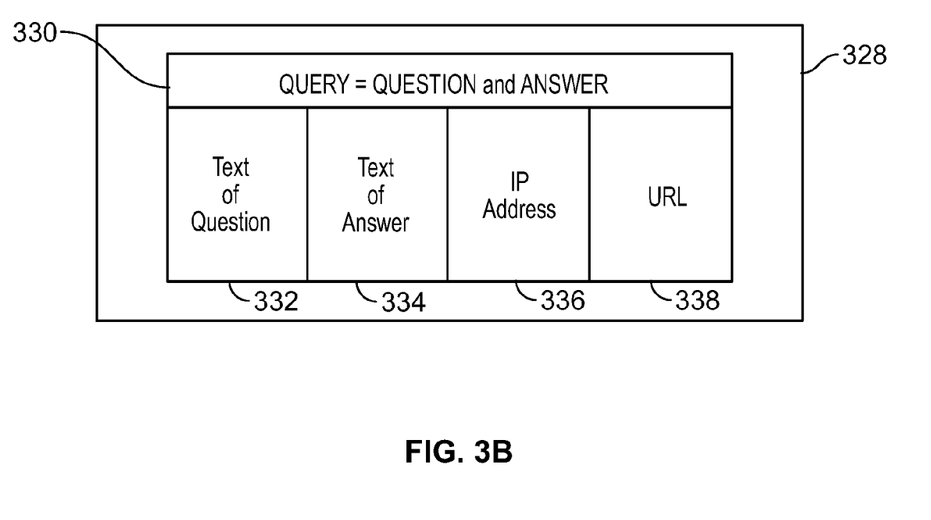
FIG. 3B shows an illustrative diagram according to certain embodiments.

FIG. 3B shows an embodiment of a query. Query 328 may include a question and an answer, as shown at 330. The text of the question may be included in the query, as shown at 332. The text of an answer may be included in the query, as shown at 334. The answer may be a response to questions 332 that a representative utilizing live chat applications, text messaging, email messages, telephone communication or any other suitable form of communications, communicated to an entity which presented the question. Query 328 may also include IP address 336 and URL 338.

In addition, query 328 may be transmitted to apparatus 311, shown in FIG. 3A. The processor of apparatus 311 may be configured to analyze the query, which in some embodiments may include a question and an answer.

In some embodiments, the question and/or answer may be created by an entity or person. An entity or person developing, researching, or engaged in a project may contemplate an FAQ and/or answer associated with the project. The contemplated FAQ and/or answer may also be passed into apparatus 311 in order to be analyzed.

In some embodiments, not shown, the query may only include an answer. The answer may also be passed to apparatus 311 in order to be analyzed.

Figure 4:
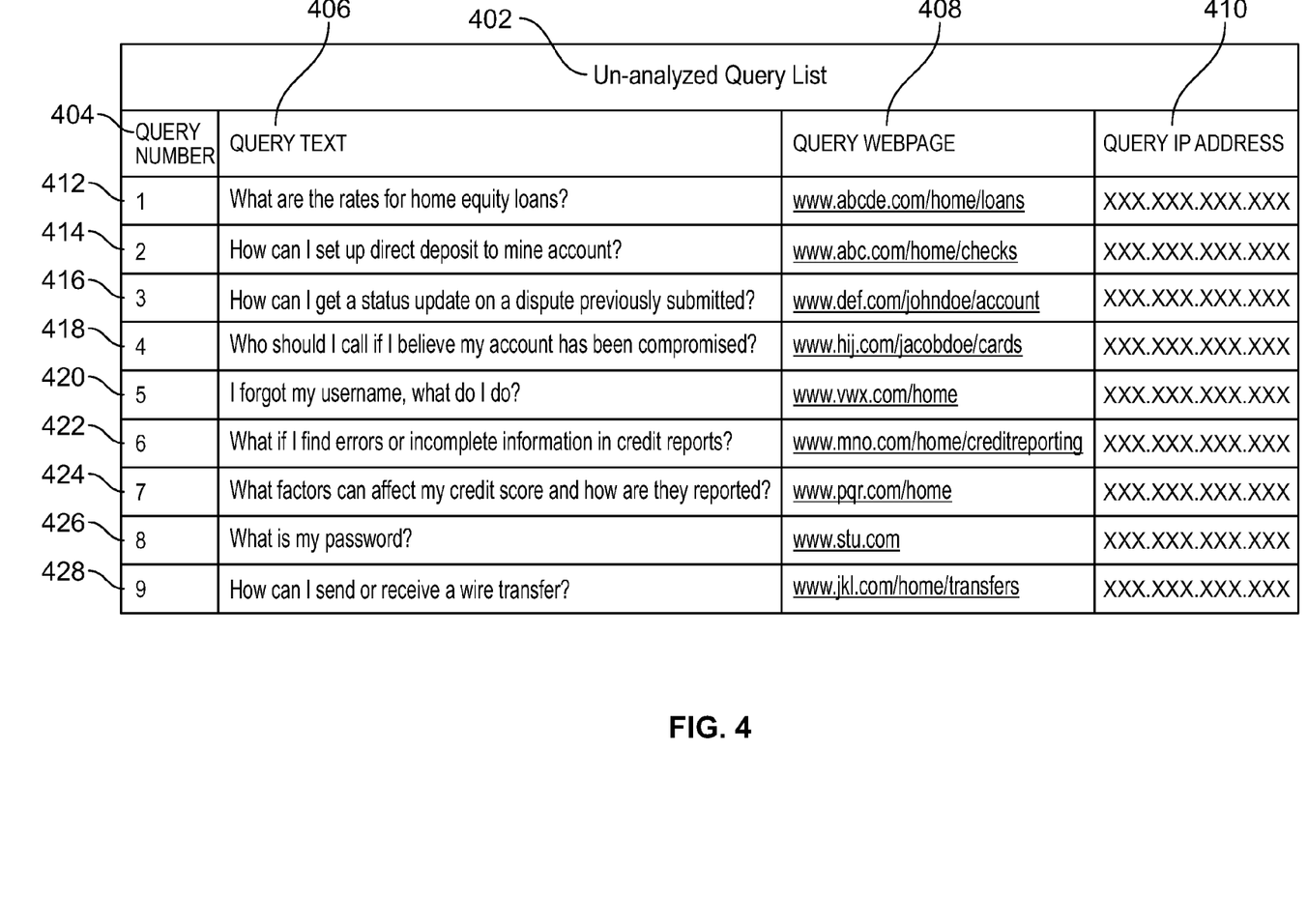
FIG. 4 shows a an illustrative diagram according to certain embodiments.

FIG. 4 shows a fictional un-analyzed query list 402. The list includes 9 queries. The query number is shown in column 404. The query text is shown in column 406. The query webpage is shown in column 408. The query IP address is shown in column 410.

Query 1, shown in row 412, includes text What are the rates for home equity loans?, the webpage www.abcde.com/home/loans and the IP address XXX.XXX.XXX.XXX.

Query 2, shown in row 414, includes text How can I set up direct deposit to mine account?, the webpage www.abc.com/home/checks and the IP address XXX.XXX.XXX.XXX.

Query 3, shown in row 416, includes text How can I get a status update on a dispute previously submitted?, the webpage www.def.com/johndoe/account and IP address XXX.XXX.XXX.XXX.

Query 4, shown in row 418, includes text Who should I call if I believe my account has been compromised?, the webpage www.hij.com/jacobdoe/cards and IP address XXX.XXX.XXX.XXX.

Query 5, shown in row 420, includes text I forgot my username, what do I do?, the webpage www.vxw.com/home and IP address XXX.XXX.XXX.XXX.

Query 6, shown in row 422, includes text What if I find errors or incomplete information in credit reports?, the webpage www.mno.com/home/creditreporting and IP address XXX.XXX.XXX.XXX.

Query 7, shown in row 424, includes text What factors affect my credit score and how are they reported?, the webpage www.pqr.com/home and IP address XXX.XXX.XXX.XXX.

Query 8, shown in row 426, includes text What is my password?, the webpage www.stu.com and IP address XXX.XXX.XXX.XXX.

Query 9, shown in row 428, includes text How can I sent or receive a wire transfer?, the webpage www.jkl.com/home/transfers and IP address XXX.XXX.XXX.XXX.

Figure 5:
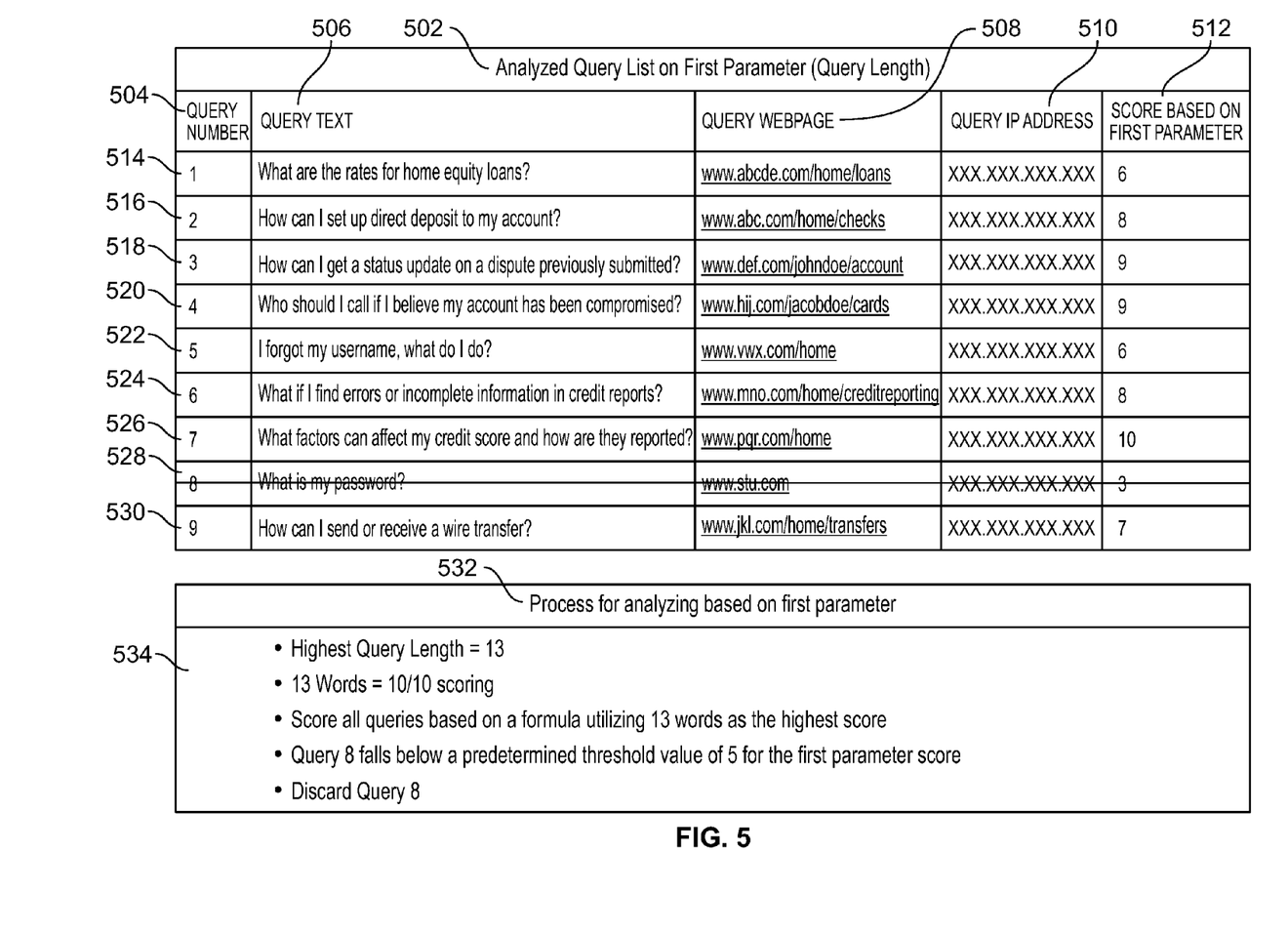
FIG. 5 shows an illustrative diagram according to certain embodiments.

FIG. 5 shows the query list of FIG. 4 analyzed based on a first parameter. Therefore, queries 1-9 referenced by numbers 514-530 are substantially similar to numbers 412-428 set forth in FIG. 4.

Analyzed query list 502 is based on a first parameter. The first parameter is query length.

Column 504 shows the query number. Column 506 shows the query text. Column 508 shows the query webpage. Column 510 shows the query IP address. Column 512 shows the score based on the first parameter.

Process 532 shows the process for analyzing based on first parameter. Instructions 534 describe the process for obtaining a score for each query based on the first parameter.

Instructions 534 include defining the query with the largest number of words. The query with the largest number of words is query seven, which contains 13 words. 13 words is given a score of ten, on a one to ten scale, where ten is the highest score. The remaining queries are scored based on the one to ten scale determined by query seven—e.g., query one contains eight words and is given a score of six based on Formula A below:

Formula A:

$$\frac{\text{Number of words in the query}}{\text{Score for the query}} = \frac{\text{of words of query with largest number of words in the plurality}}{10}$$

Formula A

Another example may be query eight. The text of query 8, shown in 528, is What is my password?. There are four words in the text of query eight. The score for query eight is calculated to be three. Query eight is determined to fall below a threshold value of five. Therefore, query eight is discarded.

FIG. 6 shows the list of FIG. 5, analyzed, utilizing the first parameter and a second parameter. Analyzed list 602 is based on a second parameter. The second parameter may be the magnitude of occurrence of predetermined language.

Process for analyzing based on second parameter 634 includes instructions 636. Instructions 636 include identifying the query with the largest magnitude of predetermined language. Column 606, shows query text. Queries one through seven and nine, which include query number (column 604), query text (column 606), query webpage (column 608) and query IP address (column 610), are substantially similar to reference numbers 412-424 and 428 in FIG. 4.

The words of the query text which may have been determined to be included in the illustrative predetermined language are underlined in the query text column 606 of queries 1-7 and 9.

Query six may include five predetermined language words. Instructions 636 may determine that five is the largest magnitude of predetermined language words included in a query. Using Formula B, five obtains a score of ten on a one to ten scale, where ten is the highest.

Formula B:

$$\frac{\text{Magnitude of predetermined language in the query}}{\text{Score for the query}} = \frac{\text{Magnitude of predetermined language of query}}{\text{with largest magnitude in plurality}}\Big/10$$

Formula B

Instruction 636 may include scoring all of the queries using Formula B, where five is the largest magnitude of predetermined language.

Instructions 636 may include calculating a mathematical average (column 616) from the score based on the first parameter (column 612) and the score based on the second parameter (column 614).

Instructions 636 may include determining that query five falls below a threshold value of five. Therefore, query five may be discarded. A line is placed through row 626 to symbolize that query five may be discarded.

Figure 7:
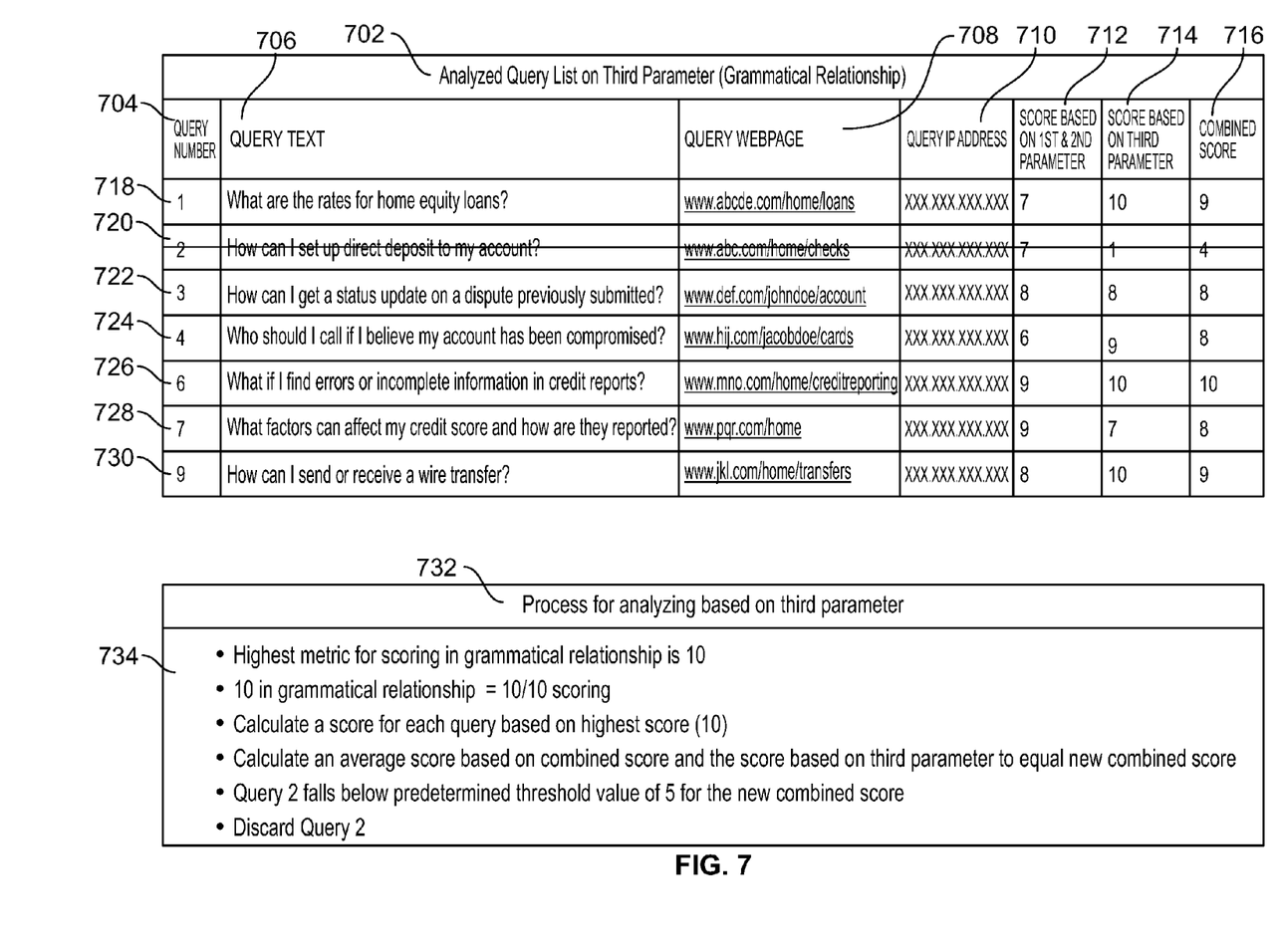
FIG. 7 shows an illustrative diagram according to certain embodiments.

FIG. 7 shows the query list of FIG. 4 analyzed based on the first parameter, the second parameter and a third parameter, shown as list 702. The third parameter may be a metric corresponding to a grammatical relationship between query terms. Columns 704, 706, 708 and 710 are substantially similar to columns 404-410 set forth in FIG. 4, but for the discarded queries which have been omitted. Queries 1-4, which are indicated by reference numbers 718-724, queries 6-7, which are indicated by reference numbers 726-728 and query 9, which is indicated by reference number 730, are substantially similar to queries one through four, referenced by 412-418, queries six through seven, referenced by 422-424, and query nine, set forth in FIG. 4 above.

Process 732 for analyzing based on a third parameter may include instructions 734. Instructions 734 may include determining the highest scoring query in the grammatical relationship. The highest score based on grammatical relationship may be ten. Using Formula C, the queries in the plurality of queries may be scored.

Formula C:

$$\frac{\text{Unweighted grammatical relationship score}}{\text{Score for the query}} = \frac{\text{Highest score for grammatical relationship in the plurality}}{10}$$

Formula C

Instructions 734 may include calculating a mathematical average (column 716) from the score based on the first and second parameters (column 712) and from the score based on the third parameter (column 714).

Instructions 734 may include determining that query two falls below a threshold value of five. Therefore, query two may be discarded. Row 720 has a line drawn through it to symbolize that query two may have been discarded.

Figure 8:
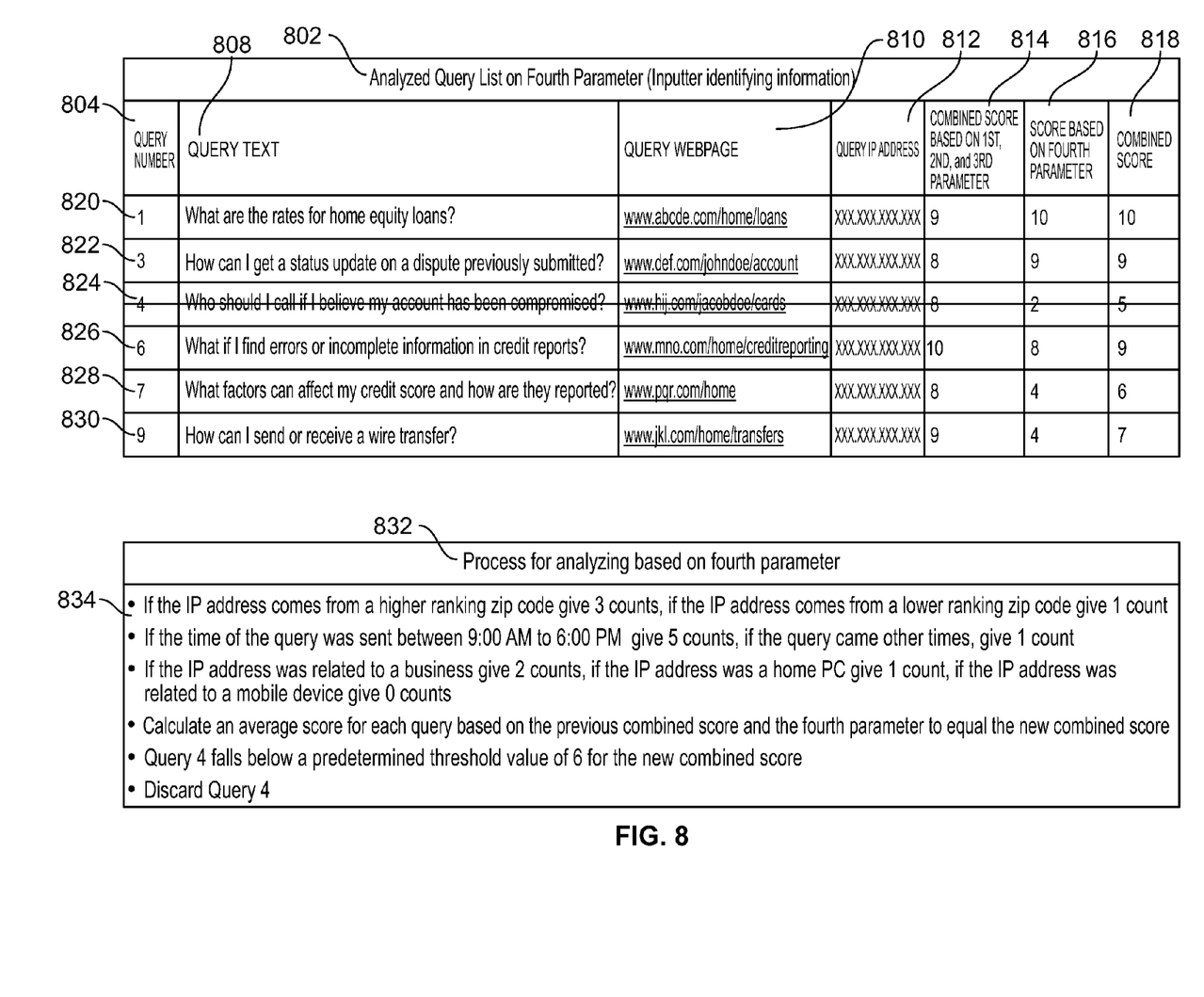
FIG. 8 shows an illustrative diagram according to certain embodiments.

FIG. 8 shows the query list of FIG. 4, analyzed based on the first parameter, the second parameter, the third parameter and a fourth parameter, as shown at 802. The fourth parameter may be inputter-identifying information. Columns 804-812 and rows 820-830 are substantially similar to those described above in FIG. 4, but for the discarded queries which have been omitted.

Process 832 for analyzing based on a fourth parameter includes instructions 834. Instructions 834 may include determining whether the IP address comes from a higher ranking zip code or lower ranking zip code. An IP address from a higher ranking zip code may be granted three counts, while an IP address from a lower ranking zip code may be granted one count. Instructions 834 include determining the time of the query. A time between 9:00 AM and 6:00 PM may be granted five counts. Any other time may be granted one count.

Instructions 834 may include determining the location of the device from which the query was transmitted. A query which is transmitted from a business location may granted two counts. A query which is transmitted from a PC may be granted one count. A query which is transmitted from a mobile device may be granted zero counts.

The counts may be totaled and placed into column 816, score based on a fourth parameter.

Instructions 834 may include calculating a mathematical average (column 818) from the previously combined score (column 814) and the score based on the fourth parameter (column 816).

Instructions 834 may include determining that query four falls below the threshold value of six. Therefore, instructions 834 may discard query four. Query four, referenced by 824, is shown with a line through it to illustrate that query four has been discarded.

Figure 9:
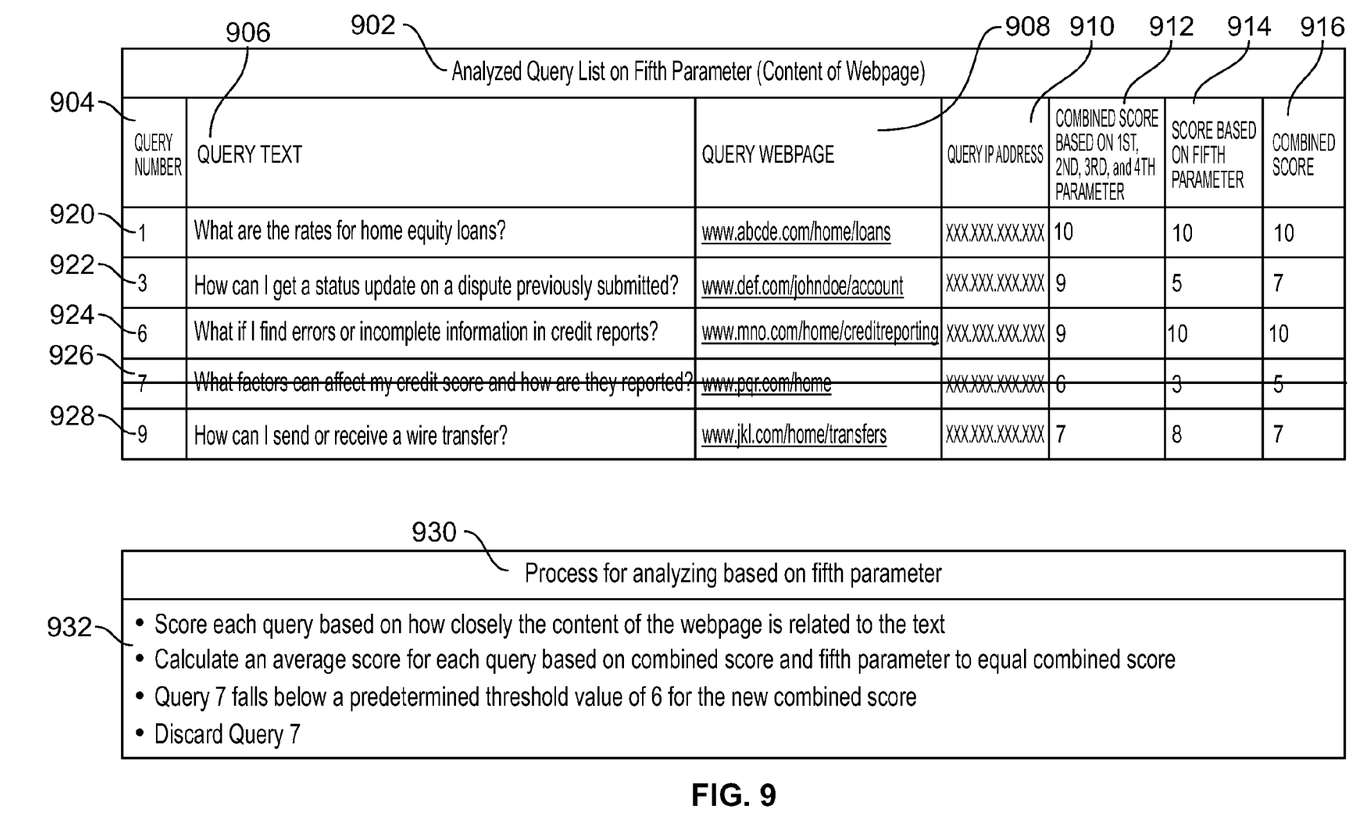
FIG. 9 shows an illustrative diagram according to certain embodiments.

FIG. 9 shows the query list of FIG. 4 analyzed based on a fifth parameter. The fifth parameter may be content of the webpage, as shown at 902. Column 904, column 906, column 908 and column 910 are substantially similar to columns 404-410 in FIG. 4. Rows 920-928 are substantially similar to rows 412, 416, 422, 424 and 428 of FIG. 4.

Process 930 for analyzing based on a fifth parameter may include instructions 932. Instructions 932 may score a query webpage (shown in column 908) based on how fitting the content of the webpage related its respective query text (shown in column 906). The score may be place in column 914, which shows the score based on a fifth parameter.

Instructions 932 may include calculating a mathematical average (column 916) from the previously determined combined score (column 912) and the score based on the fifth parameter (column 914).

Instructions 932 may include determining that query seven falls below a predetermined threshold value of six. Therefore, instructions 932 may discard query seven. Query seven, shown in 926, has a line through it to illustrate that query seven may have been discarded.

Figure 10:
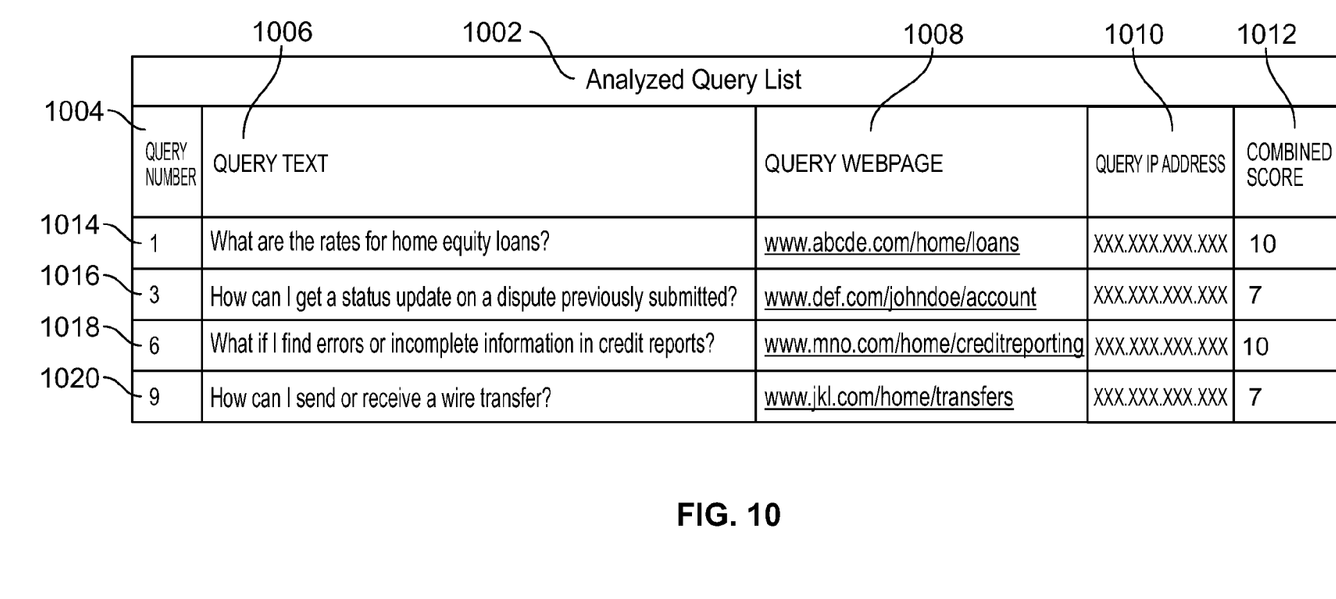
FIG. 10 shows an illustrative diagram according to certain embodiments.

FIG. 10 shows the completed analyzed list 1002 based on five parameters. Column 1004 includes the query number. Column 1006 includes the query text. Column 1008 includes the query webpage. Column 1010 includes the query IP address. Column 1012 includes the completed combined query score. Queries one, three, six and nine, referenced by 1014-1020, may have been determined to be the most beneficial and useful queries. Queries one, three, six and nine may be included on a website FAQ list.

Queries one, three, six and nine may be transmitted to a party or entity in the form of a report, email or any other suitable transmission form. The apparatus, utilizing web-crawling technologies, may transmit reports comparable to FIG. 10 at any suitable time. The apparatus may also be configured to transmit the results at any suitable rate—e.g. daily, weekly, bi-weekly, monthly, yearly or upon request.

The transmission of reports may enable website administrators to determine useful, informative and noteworthy questions. These questions may be included on website FAQ lists or any other suitable location.

Thus, methods and apparatus for extracting queries from web pages are provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for extracting queries from webpages, the apparatus comprising:
   a receiver configured to receive:
      a plurality of queries, wherein each query, included in the plurality, is input into a distinct search box located on a distinct public-facing webpage;
      content associated with each public-facing webpage;
      identifying information associated with each inputter of each distinct query;
   a processor configured to:
      analyze each query in the plurality of queries based on a first parameter, the first parameter being query length;
      discard a query, from the plurality of queries, said query which falls below a predetermined threshold with respect to fulfillment of the first parameter;
      analyze each query in the plurality of queries based on a second parameter, the second parameter being the magnitude of predetermined terminology included in each query's language, said predetermined terminology stored on a computer-readable memory;

discard a query, from the plurality of queries, said query which falls below a predetermined threshold with respect to fulfillment of the second parameter;

analyze each query in the plurality of queries based on a third parameter, the third parameter being a grammatical relationship of query terms to one another;

discard a query, from the plurality of queries, said query which falls below a predetermined threshold with respect to fulfillment of the third parameter;

analyze each query in the plurality of queries based on a fourth parameter, the fourth parameter being identifying information of an inputter of each query;

discard a query, from the plurality of queries, said query which falls below a predetermined threshold with respect to fulfillment of the fourth parameter;

analyze each query in the plurality of queries based on a fifth parameter, the fifth parameter being the content of the public-facing webpage associated with each query;

discard a query, from the plurality of queries, said query which falls below a predetermined threshold with respect to fulfillment of the fifth parameter.

2. The apparatus of claim 1, wherein the processor is further configured to:
  analyze each query, in the plurality of queries, based on a sixth parameter, the sixth parameter being a geographical location of the inputter;
  discard a query, from the plurality of queries, said query which falls below a predetermined threshold with respect to fulfillment of the sixth parameter.

3. The apparatus of claim 1, wherein the processor is further configured to:
  analyze each query, in the plurality of queries, based on a sixth parameter, the sixth parameter being a cyberspace location of the inputter;
  discard a query, from the plurality of queries, said query which falls below a predetermined threshold with respect to fulfillment of the sixth parameter.

4. The apparatus of claim 1, wherein the apparatus is configured to store the at least one query on the computer readable memory.

5. The apparatus of claim 1, wherein the grammatical relationship is predetermined by an entity.

\* \* \* \* \*